United States Patent
Holland et al.

(10) Patent No.: US 6,931,314 B2
(45) Date of Patent: Aug. 16, 2005

(54) METHOD OF AUTOMATING A LOADING AND UNLOADING OF CONTAINER SHIPS IN CONTAINER TERMINALS, AND CRANE AUTOMATION SYSTEM

(75) Inventors: Maarten Holland, Poxdorf (DE); Wolfgang Wichner, Wendelstein (DE)

(73) Assignee: Siemens Aktiengesellschaft, München (DE)

( * ) Notice: Subject to any disclaimer, the term of this patent is extended or adjusted under 35 U.S.C. 154(b) by 70 days.

(21) Appl. No.: 10/445,385

(22) Filed: May 23, 2003

(65) Prior Publication Data

US 2004/0030478 A1 Feb. 12, 2004

(30) Foreign Application Priority Data

May 31, 2002 (DE) .......................... 102 24 312

(51) Int. Cl.[7] .......................... B63B 27/00; B65G 67/60
(52) U.S. Cl. .................. 701/50; 414/139.4; 414/140.3; 414/140.4; 414/141.3; 414/803
(58) Field of Search .................. 414/139.4, 140.3, 414/140.4, 141.3, 803; 701/50, 21

(56) References Cited

U.S. PATENT DOCUMENTS

| | | | | |
|---|---|---|---|---|
| 3,669,288 A | * | 6/1972 | Young | 414/803 |
| 3,952,891 A | * | 4/1976 | Terayama et al. | 414/809 |
| 4,172,685 A | * | 10/1979 | Nabeshima et al. | 414/139.7 |
| 4,973,219 A | | 11/1990 | Brickner et al. | |
| 5,154,561 A | * | 10/1992 | Lee | 414/138.3 |
| 5,505,585 A | * | 4/1996 | Hubbard | 414/803 |
| 5,613,826 A | * | 3/1997 | Scott | 414/802 |
| 2002/0024598 A1 | * | 2/2002 | Kunimitsu et al. | 348/159 |
| 2002/0161675 A1 | * | 10/2002 | Kawase | 705/29 |
| 2003/0167214 A1 | * | 9/2003 | Kang | 705/29 |
| 2003/0190057 A1 | * | 10/2003 | Takehara et al. | 382/104 |
| 2004/0126015 A1 | * | 7/2004 | Hadell | 382/181 |

FOREIGN PATENT DOCUMENTS

| | | |
|---|---|---|
| DE | 24 10 987 | 9/1975 |
| DE | 4405525 C2 | 1/1997 |
| DE | 19502421 C2 | 3/1997 |
| DE | 19836103 A1 | 2/2000 |
| DE | 198 41 570 A1 | 3/2000 |
| DE | 29921246 U1 | 3/2000 |
| DE | 10001023 A1 | 7/2001 |
| DE | 100 01 023 A1 | 7/2001 |
| DE | 100 54 468 A1 | 5/2002 |
| DE | 201 21 503 U1 | 4/2003 |
| EP | 0596330 B1 | 5/1997 |
| EP | 0665184 | 3/1999 |

* cited by examiner

Primary Examiner—Thomas G. Black
Assistant Examiner—Brian J. Broadhead
(74) Attorney, Agent, or Firm—Henry M. Feiereisen

(57) ABSTRACT

In a method of automating the loading and unloading of container ships in container terminals, a stowage plan of a ship cargo compartment to be handled by a container crane is transmitted from a harbor-side master computer via a data link to a PC of a crane automation system which renders the container crane operative in response to the stowage plan for transporting containers between a container ship and a repository location in a container storage area of the container terminal. The stowage plan is displayed on a touch screen of the crane automation system, whereby a next following repository location to be handled in the stowage plan is indicated on the touch screen, e.g. through a change in color.

23 Claims, 3 Drawing Sheets

METHOD OF AUTOMATING A LOADING AND UNLOADING OF CONTAINER SHIPS IN CONTAINER TERMINALS, AND CRANE AUTOMATION SYSTEM

CROSS-REFERENCES TO RELATED APPLICATIONS

This application claims the priority of German Patent Application, Serial No. 102 24 312.3, filed May 31, 2002, pursuant to 35 U.S.C. 119(a)–(d), the disclosure of which is incorporated herein by reference.

BACKGROUND OF THE INVENTION

The present invention relates to a method of automating a loading and unloading of container ships in container terminals by means of a container crane, and to a crane automation system for controlling operation of the container crane.

A crane automation system is used to control the container crane for transporting containers between the container ships and a repository location in a container storage area of the container terminal. During loading and unloading of container ships, the crane operator or the automation system of the container crane must be informed about the container to be loaded or unloaded. Typically, while the stowage plan of a container ship is transmitted electronically from the departure port to the destination port, the crane operator receives cargo lists in paper form before commencing the loading or unloading operations. It is thus up to the crane operator alone to decide the sequence of transports between the container ship and the repository location. Another approach involves the deck crew on the container ship to radio the desired sequence to the crane operator. Not only increases this approach the need for personnel but the unloading and loading operations of a container ship become very time-consuming. In either case, the error rate during loading and unloading is comparably high.

It would therefore be desirable and advantageous to provide an improved method of automating the loading and unloading of container ships in container terminals, to obviate prior art shortcomings and to enable a loading and unloading between container ships, on the one hand, and a repository location or locations in a storage area of a container terminal, on the other hand, in a substantially automated manner while optimizing the movements of a container crane for loading and unloading operations.

SUMMARY OF THE INVENTION

According to one aspect of the present invention, a method of automating a loading and unloading of a container ship in a container terminal, includes the steps of transmitting a stowage plan of a ship cargo compartment, which is to be handled by a container crane, from a harbor-side master computer via a data link to a PC of a crane automation system which renders the container crane operative in response to the stowage plan for transporting containers between a container ship and a repository location in a container storage area of the container terminal, displaying the stowage plan on a touch screen of the crane automation system, and indicating a next following repository location to be handled in the stowage plan on the touch screen.

The present invention resolves prior art problems by providing a data transmission between a dock master computer of the destination port, on the one hand, and the crane operator of a container crane and the associated crane automation system, on the other hand.

According to another feature of the present invention, the next following repository location can be indicated on the touch screen through a change in color. Suitably, the data link between the PC and the harbor-side master computer may be implemented using Ethernet connection. The stowage plan of the ship cargo compartment that is actually handled may suitably be displayed as a ship's cross section.

When the space coordinates of the next following repository location are indicated on the touch screen simultaneously with the display of this stowage plane and transmitted to the crane automation system, whereby the desired target setting mechanism is executed on the same PC, it is possible to automatically target the repository location or container which is intended as target. Except for the depositing of containers on or pickup of containers from the container ship, all movements of the container crane can be automated.

According to another feature of the present invention, the touch screen may be constructed to visualize executed automatic operations and to allow manipulations for modifying the desired target setting by means of a keying device. In this way, an exceptional situation can be dealt with or a sudden demand can be satisfied.

According to another feature of the present invention, a crane trolley of the container crane may be moved across the entire ship cargo compartment before loading or unloading containers to scan the cargo compartment and thereby acquire a stowage profile thereof. As a result of the scanning operation, the absolute space coordinates of the container cargo and their containers in the container ship can be determined. Hereby, the position of the container ship as well as currents can be taken into account. The scanned stowage profile can then be used for executing a plausibility check of the stowage plan transmitted beforehand from the harbor-side master computer to the PC of the crane automation system. Suitably, the stowage profile may be acquired through laser scanning.

According to another feature of the present invention, an optimal desired space trajectory for the container transport may be calculated on the basis of data relating to the stowage profile for the desired target setting mechanism of the crane automation system and obstacles during transport operations.

According to another feature of the present invention, the automation method may be complemented by a process which involves a verification of a container number of each container being loaded or unloaded through use of a camera system to optically detect the container number on the container crane. The detected container number is then compared in a control unit or in the harbor-side master computer, connected to the control unit, with a predetermined container number for the pertaining repository location.

According to another aspect of the present invention, a crane automation system for a container crane for transporting containers for loading and unloading container ships and transport thereof between the container ships and the on-shore side of a container terminal, includes a harbor-side master computer, a PC operatively connected to the master computer via a data link to receive a stowage plan of the cargo compartment of a container ship to be handled by the container crane, and a touch screen for displaying the stowage plan transmitted to the PC, with the touch screen being constructed to indicate a next following repository location to be handled in the stowage plan.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
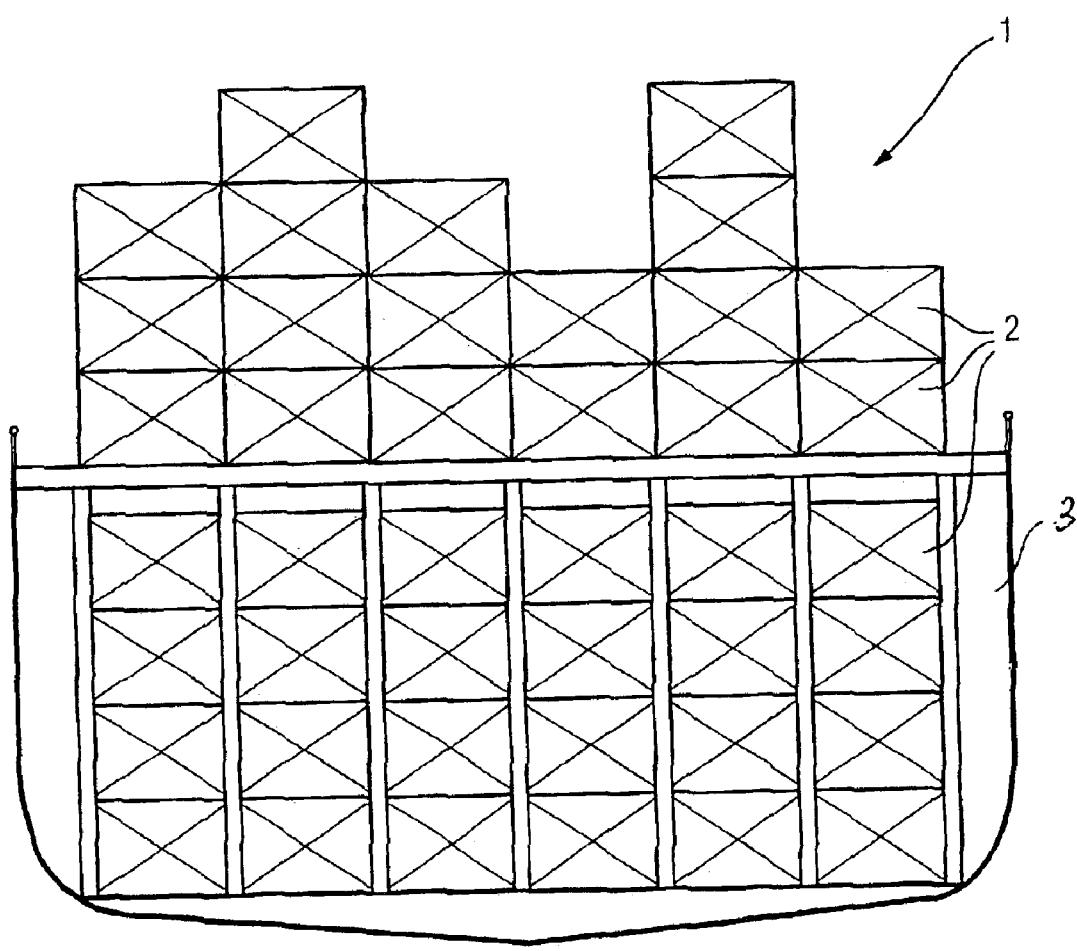
FIG. 1 is a schematic cross sectional view of a container ship depicting an exemplified stowage plan of the ship cargo.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
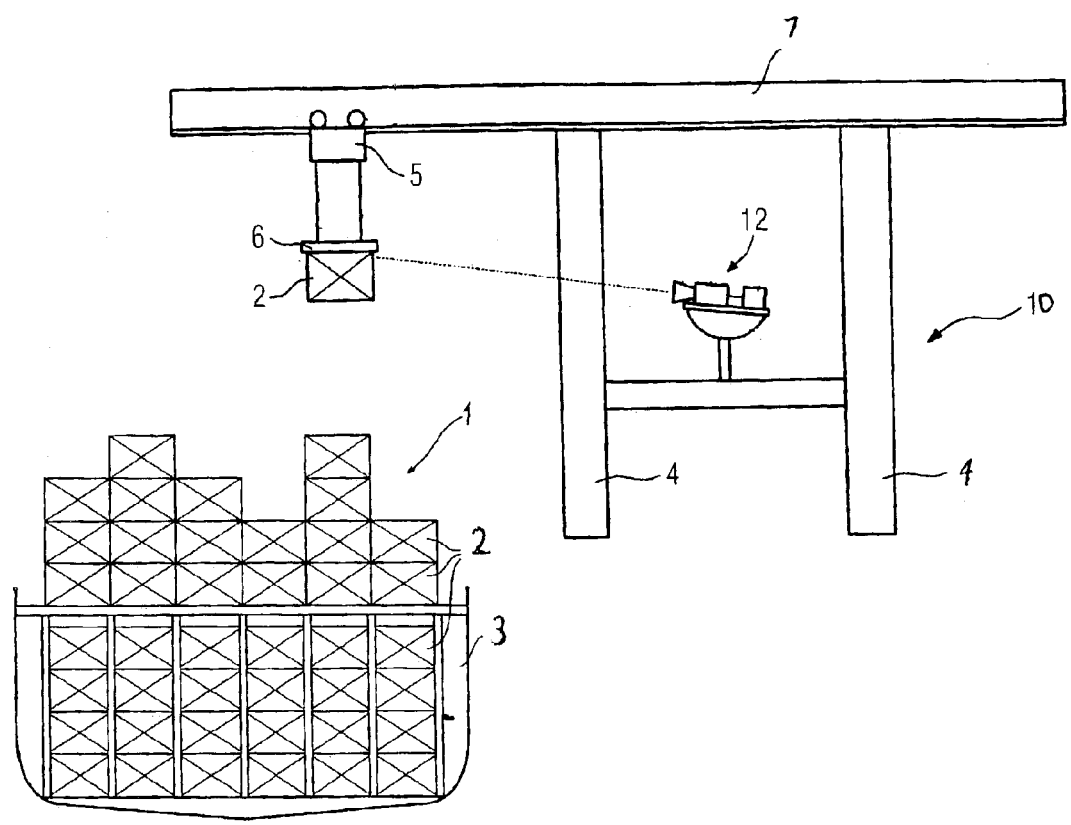
FIG. 2 is a side view of a basic configuration of an exemplified container crane for loading and unloading of containers and equipped with a camera system for verification of container numbers.

Turning now to the drawing, and in particular to FIG. 1, there is shown a schematic cross sectional view of a container ship 1 having a cargo compartment 3 for stowing a plurality of containers 2 according to a stowage plan. Loading and unloading of the container ship 1 is implemented typically in a container terminal 40 (FIG. 3) which is configured for this purpose and for a further transport of the containers 2. Hereby, the containers 2 are moved back and forth between container ships 2 and a repository location or several repository locations in a container storage area of the container terminal 40 by means of container cranes. An exemplified container crane, generally designated by reference numeral 10, is illustrated in FIG. 2 and typically includes a footing block comprised of legs 4. A trolley 5 is movably arranged on the container crane 1 along a beam 7 for supporting a load-carrying member or spreader 6 which is movable in a vertical direction for lifting and lowering a container 2. An exemplified construction of such a container crane 10 is fully described in commonly owned patent application filed on the same day and having the same inventive entity and entitled "Apparatus and Method for Verification of Container Numbers during Unloading and Loading of Ships by Container Cranes in Container Terminals", the entire specification and drawings of which are expressly incorporated herein by reference.

Figure 3:
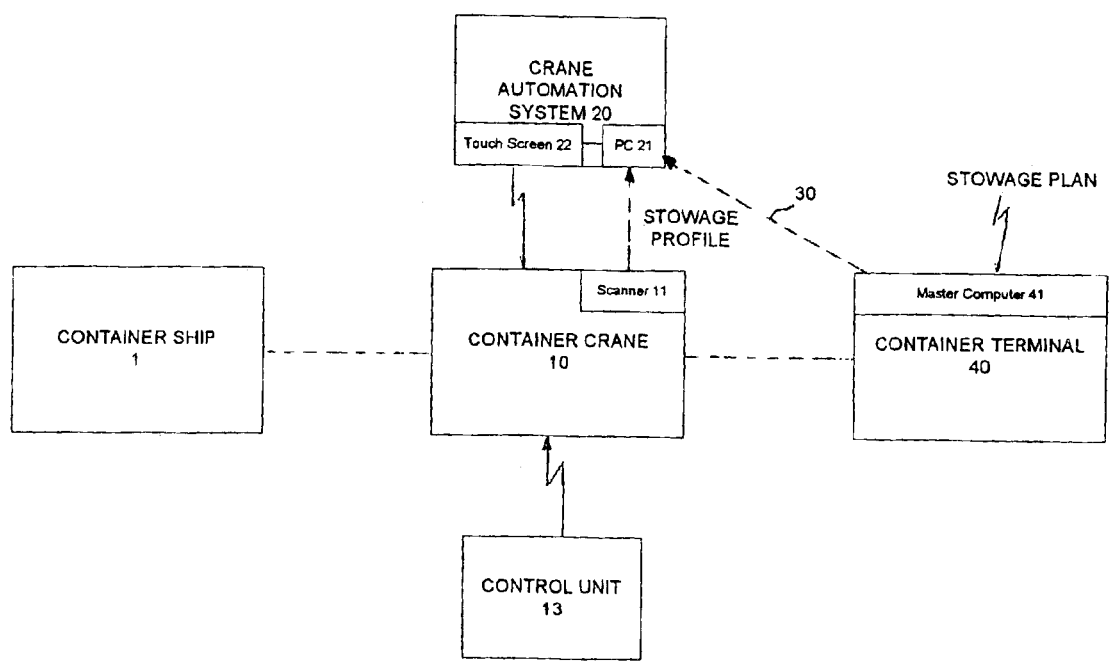
FIG. 3 is a block diagram, incorporating the subject matter of the present invention.

As shown in FIG. 3, the container crane 10 is equipped with a crane automation system 20 for automating the loading and unloading of the container ship 1 in the container terminal 40 through control of the container crane 10. The crane automation system 20 includes a PC 21 which is operatively connected to a harbor-side master computer 41 of the container terminal 40 via a suitable data link 30, e.g. an Ethernet connection. Recorded in the master computer 41 is a stowage plan of the cargo of the container ship 1 which has docked at the container terminal 40. This stowage plan is transmitted by the operator of the container ship 1 in a suitable fashion to a ship loading ramp or the like and ultimately inputted in the harbor-side master computer 41 of the container terminal 40.

The stowage plan is transmitted to the PC 21 of the crane automation system 20 via the data link 30 between the container terminal 40 and the crane automation system 20 of the container crane 10, which is used here by way of example to unload the container ship 1. Thus, the crane automation system 20 for the container crane 10 contains the actual stowage plan for the cargo compartment 3 of the container ship 1 being processed.

The crane automation system 20 further includes a touch screen 22 which displays the stowage plan and allows the crane operator to send signals to the PC 21 by touching an area on the display.

The PC 21 of the crane automation system 20 provides a desired target setting for the container crane 10 in accordance with fixed strategies, e.g. according to a vertical transshipping operation, vertical transshipping operation. As an alternative thereto, the master computer 41 may provide via the data link 30 information about the next target or next repository location, whereby the touch screen 22, which displays the stowage plan of the currently handled cargo compartment 3, indicates to the crane operator through a change in color the repository location or container 2 to be processed next. Space coordinates of the repository location or container 2 to be targeted next are transmitted to the crane automation system 20 simultaneously with the display of this repository location or container 2 on the touch screen 22 through change in color, whereby the PC, which is also associated to the touch screen 22, executes the target setting mechanism.

The repository location or container 2 selected next for processing is then targeted automatically by the container crane 10 as controlled by the crane automation system 20. The touch screen 22 informs the crane operator about the automatically executed operations. The touch screen 22 is further provided with a keying device, e.g. configured as +/− key, to permit the crane operator to manipulate the automatic operation, e.g. by modifying the given target or the like. This may become necessary to adjust to changing situations.

The trolley 5 of the container crane 10 is suitably equipped with a scanner, e.g. a laser scanner 11, which scans the cargo compartment 3, as the trolley 5 travels, before commencing the loading and unloading operation, once across the entire cargo department 3 to thereby generate a stowage profile. The scanned stowage profile is inputted into the PC 21 of the crane automation system 20 to enable the PC 21 to execute a plausibility check of the stowage plan transmitted to the PC 21. In addition, as a result of the scanned stowage profile, the absolute space coordinates of the cargo can be determined, whereby a disposition of the ship 1 and the tide or currents are taken into account. The determined space coordinates can be used for the crane automation system 20 to devise target settings and to calculate an optimum space trajectory for the container transport in situations when the containers 2 pose obstacles.

In order to eliminate further error sources during container transshipment within the container terminal 40, the container crane 10 is equipped with a camera system 12, as shown in FIG. 2, for optically detecting a container number, provided at a particular area on each container 2, when the respective container 2 has been picked up by the container crane 10. The camera system is operatively connected to a control unit 13. By means of the control unit 11, or the harbor-side master computer 41 which is operatively connected to the control unit 13, it is possible to determine whether the container number optically detected by the camera system 12 matches the intended container number which is preset in the control unit 13 or master computer 41 for the respective repository location in accordance with the transmitted stowage plan. Thus, incorrect positioning of containers 2 on the container ship 1 or on the repository location of the container terminal 41 can be prevented.

An exemplified camera system is fully described in the commonly owned patent application, as referred above and entitled "Apparatus and Method for Verification of Container Numbers during Unloading and Loading of Ships by Container Cranes in Container Terminals". Of course, any system other than the described optical imaging system, may be used to verify container numbers, including systems which recognize the respective container by way of a transmitted response to electromagnetic waves, whereby in this case the containers are provided with transponders.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method of automating the loading and unloading of a container ship in a container terminal, comprising the steps of:

transmitting a stowage plan of a ship cargo compartment, which is to be handled by a container crane, from a harbor-side master computer via a data link to a PC of a crane automation system which renders the container crane operative in response to the stowage plan for transporting containers between a container ship and a repository location in a container storage area of the container terminal;

displaying the stowage elan on a touch screen of the crane automation system;

indicating a next following repository location to be handled in the stowage plan on the touch screen; and displaying on the touch screen space coordinates of a next following repository location simultaneously with a display of the stowage plan of said next following repository location, with a desired target setting program executed on the PC.

2. The method of claim 1, wherein the data link is implemented using Ethernet connection.

3. The method of claim 1, wherein the next following repository location is indicated on the touch screen through a change in color.

4. The method of claim 1, wherein the stowage plan of the ship cargo compartment being handled is illustrated as ship's cross section.

5. The method of claim 1, wherein the touch screen visualizes automatically executed operations, and further comprising the step of allowing a modification of the target setting by means of a keying device.

6. The method of claim 1, and further comprising the steps of verifying a container number of each container being loaded or unloaded by using a camera system to optically ascertain the container number on the container crane, and comparing the ascertained container number in a control unit or a harbor-side master computer, connected to the control unit, with a predetermined container number for a corresponding one of the repository locations.

7. A method of automating the loading and unloading of a container ship in a container terminal, comprising the steps of:

transmitting a stowage plan of a ship cargo compartment, which is to be handled by a container crane, from a harbor-side master computer via a data link to a PC of a crane automation system which renders the container crane operative in response to the stowage plan for transporting containers between a container ship and a repository location in a container storage area of the container terminal;

displaying the stowage plan on a touch screen of the crane automation system;

indicating a next following repository location to be handled in the stowage plan on the touch screen; and moving a crane trolley of the container crane across the entire ship cargo compartment before loading or unloading containers and thereby scanning the cargo compartment to acquire a stowage profile, and executing a plausibility check of the stowage plan on the basis of the scanned stowage profile.

8. The method of claim 7, wherein the stowage profile is acquired through laser scanning.

9. The method of claim 7, and further comprising the step of calculating an optimum space trajectory for a container transport on the basis of data relating to the stowage profile for a target setting program of the crane automation system and obstacles.

10. The method of claim 7, and further comprising the steps of verifying a container number of each container being loaded or unloaded by using a camera system to optically ascertain the container number on the container crane, and comparing the ascertained container number in a control unit or a harbor-side master computer, connected to the control unit, with a predetermined container number for the corresponding repository location.

11. The method of claim 7, wherein the data link is implemented using Ethernet connection.

12. The method of claim 7, wherein the next following repository location is indicated on the touch screen through a change in color.

13. The method of claim 7, wherein the stowage plan of the ship cargo compartment being handled is illustrated as ship's cross section.

14. A crane automation system for a container crane for transporting containers between container ships and an on-shore side of a container terminal for loading and unloading container ships, comprising:

a harbor-side master computer;

a PC operatively connected to the master computer via a data link to receive a stowage plan of the cargo compartment of a container ship to be handled by the container crane; and a touch screen for displaying the stowage plan transmitted to the PC, said touch screen being constructed to indicate a next following repository location to be handled in the stowage plan, wherein the PC executes a desired target setting program, and the touch screen displays space coordinates of the next following repository location at a same time as the display of the repository location.

15. The crane automation system of claim 14, wherein the touch screen displays automatically executed operations and includes a keying device for modifying the desired target setting.

16. The crane automation system of claim 14, and further comprising a scanning device provided on a trolley of the container crane for acquiring a stowage profile of the ship cargo compartment.

17. The crane automation system of claim 16, wherein the scanning device is a laser scanner.

18. The crane automation system of claim 16, and further comprising a controller assembly configured to calculate a desired space trajectory for a container transport on the basis of data relating to the stowage profile for the target setting program of the crane automation system and obstacles.

19. The crane automation system of claim 16, wherein the PC is configured to calculate a desired space trajectory for a container transport on the basis of data relating to the stowage profile for the target setting program of the crane automation system and obstacles.

20. The crane automation system of claim 14, and further comprising a camera system for optically detecting a container number of a container attached to the container crane at any given time, and a control unit operatively connected to the camera system for comparing the detected container number with a container number predetermined for a respective one of the repository locations.

21. The crane automation system of claim 14, and further comprising a camera system for optically detecting a container number of a container attached to the container crane at any given time, a harbor-side master computer, and a control unit operatively connected to the master computer for comparing the detected container number with a container number predetermined for a respective one of the repository locations.

22. The crane automation system of claim 14, wherein the data link is implemented using Ethernet connection.

23. The crane automation system of claim 14, wherein the touch screen is constructed to display the stowage plan of a next following repository location through a change in color.

* * * * *